(12) United States Patent
Yang et al.

(10) Patent No.: US 11,830,996 B1
(45) Date of Patent: Nov. 28, 2023

(54) BATTERY, POWER CONSUMING APPARATUS, AND METHOD AND APPARATUS FOR MANUFACTURING BATTERY

(71) Applicant: CONTEMPORARY AMPEREX TECHNOLOGY CO., LIMITED, Ningde (CN)

(72) Inventors: Haiqi Yang, Ningde (CN); Zhimin Zeng, Ningde (CN); Yu Tang, Ningde (CN); Xiaoteng Huang, Ningde (CN); Peng Wang, Ningde (CN); Chenyi Xu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/352,276

(22) Filed: Jul. 14, 2023

Related U.S. Application Data

(63) Continuation of application No. PCT/CN2021/109722, filed on Jul. 30, 2021.

(51) Int. Cl.
  *H01M 10/613* (2014.01)
  *H01M 50/588* (2021.01)
  (Continued)

(52) U.S. Cl.
  CPC ..... *H01M 10/613* (2015.04); *H01M 10/0481* (2013.01); *H01M 10/6569* (2015.04);
  (Continued)

(58) Field of Classification Search
  CPC ........... H01M 10/613; H01M 10/6569; H01M 10/0481; H01M 50/505; H01M 50/588; H01M 2220/20
  See application file for complete search history.

(56) References Cited

U.S. PATENT DOCUMENTS 9,431,686 B2 8/2016 Omura et al.
10,186,738 B2 1/2019 Omura et al.
(Continued)

FOREIGN PATENT DOCUMENTS

CN 109301116 A 2/2019
CN 211670261 U 10/2020
(Continued)

OTHER PUBLICATIONS

International Search Report received in the corresponding International Application PCT/CN2021/109722, dated Apr. 25, 2022.
(Continued)

*Primary Examiner* — Jimmy Vo
(74) *Attorney, Agent, or Firm* — Kilpatrick Townsend & Stockton LLP

(57) ABSTRACT

Provided are a battery, comprising: a battery cell group comprising N battery cell rows arranged in a first direction, battery cells in each battery cell row being arranged in a second direction, the first direction being perpendicular to the second direction; a signal transmission assembly provided on the first face of the battery cell group and comprising a busbar component and an insulation layer, the busbar component being configured to be electrically connected to the battery cells at holes of the insulation layer; and a cooling system provided between two adjacent battery cell rows in the N battery cell rows, with a blocking member being provided at an opening, facing the first face, of a gap between the two adjacent battery cell rows to block the opening to prevent condensed liquid generated by the cooling system from reaching the busbar component.

11 Claims, 10 Drawing Sheets

(51) Int. Cl.
  *H01M 10/6569* (2014.01)
  *H01M 50/505* (2021.01)
  *H01M 10/04* (2006.01)

(52) U.S. Cl.
  CPC ....... *H01M 50/505* (2021.01); *H01M 50/588* (2021.01); *H01M 2220/20* (2013.01)

(56) References Cited

U.S. PATENT DOCUMENTS

| | | |
|---|---|---|
| 2013/0337310 A1 | 12/2013 | Omura et al. |
| 2016/0329617 A1 | 11/2016 | Omura et al. |
| 2021/0218087 A1 | 7/2021 | Yoo et al. |

FOREIGN PATENT DOCUMENTS

| | | | |
|---|---|---|---|
| CN | 111952499 | A | 11/2020 |
| CN | 112018303 | A | 12/2020 |
| CN | 112018321 | A | 12/2020 |
| CN | 112103447 | A | 12/2020 |
| CN | 212810495 | U | 3/2021 |
| CN | 112909398 | A | 6/2021 |
| JP | 2012043767 | A | 3/2012 |
| JP | 2014044884 | A | 3/2014 |
| JP | 2015210894 | A | 11/2015 |
| JP | 2017208298 | A | 11/2017 |
| JP | 2021536099 | A | 3/2022 |
| KR | 20170140694 | A | 12/2017 |
| KR | 20200014240 | A | 2/2020 |

OTHER PUBLICATIONS

Written Opinion received in the corresponding International Application PCT/CN2021/109722, dated Apr. 25, 2022.
First office action received in the corresponding Korean application 10-2023-7005329, dated Apr. 24, 2023.
Decision to Grant a Patent received in the corresponding Japanese application 2023-512757, dated Aug. 21, 2023.

BATTERY, POWER CONSUMING APPARATUS, AND METHOD AND APPARATUS FOR MANUFACTURING BATTERY

CROSS REFERENCE TO RELATED APPLICATIONS

The present application is a continuation of International Application PCT/CN2021/109722, filed on Jul. 30, 2021 and entitled "BATTERY, POWER CONSUMING APPARATUS, AND METHOD AND APPARATUS FOR MANUFACTURING BATTERY", the entire disclosure of which is incorporated herein by reference.

TECHNICAL FIELD

The present application relates to the technical field of batteries, and in particular to a battery, a power consuming apparatus, and a method and apparatus for manufacturing the battery.

BACKGROUND ART

With the increasing environmental pollution, the new energy industry has attracted increased attention. In the new energy industry, battery technology is a key factor in its development.

In the development of the battery technology, the problem of safety is not negligible. If the safety of batteries cannot be guaranteed, the batteries cannot be used.

When the battery is in a high-temperature and high-humidity environment, it is easy to generate condensed liquid in a case of the battery, which will cause a potential safety hazard to affect the safety of the battery. Therefore, how to enhance the safety of batteries is an urgent technical problem to be solved in the battery technology.

SUMMARY OF THE INVENTION

Embodiments of the present application provide a battery, a power consuming apparatus, and a method and apparatus for manufacturing the battery, which can enhance the safety of the battery.

In a first aspect, a battery is provided. The battery comprises: a battery cell group comprising N battery cell rows arranged in a first direction, battery cells in each of the N battery cell rows being arranged in a second direction, the first direction being perpendicular to the second direction, and N being an integer greater than 1; a signal transmission assembly provided on a first face of the battery cell group, the first face being parallel to a plane determined by the first direction and the second direction, the signal transmission assembly comprising a busbar component and an insulation layer, the insulation layer being used to enclose the busbar component, the insulation layer having holes, and the busbar component being configured to be electrically connected to the battery cells in the battery cell group at the holes; and a cooling system provided between two adjacent battery cell rows in the N battery cell rows, wherein a blocking member is provided at an opening, facing the first face, of a gap between the two adjacent battery cell rows, and is used to block the opening to prevent condensed liquid generated by the cooling system from reaching the busbar component.

An embodiment of the present application provides a battery comprising a battery cell group, a signal transmission assembly, and a cooling system. The signal transmission assembly comprises a busbar component for transmitting the electric energy of the battery cell group and an insulation layer for enclosing the busbar component. The insulation layer can be provided to reduce the influence of external environmental factors on the busbar component to ensure the transmission performance and safety performance of the busbar component. In order to realize the electrical connection between the busbar component and the battery cell group, the insulation layer is provided with the holes, and the busbar component is configured to be electrically connected to the battery cells in the battery cell group at the holes. In addition, the cooling system can be provided between two adjacent battery cell rows in the battery cell group, and can be used to cool the battery cells in the battery cell group to prevent the battery cells from heating up and causing safety problems. Also, a blocking member is provided at an opening, at the first fat face of the battery cell group, of the gap between the two adjacent battery cell rows to prevent the condensed liquid generated by the cooling system from reaching the busbar component in the signal transmission assembly, which prevents the condensed liquid from causing problems such as short-circuiting and corrosion of the busbar component and thus prevents safety issues such as fires and explosions that can be caused by short-circuiting so as to improve the safety performance of the battery, and also solves battery life problems caused by corrosion so as to improve the overall life of the battery.

In a possible implementation, the blocking member extends into the gap, which improves the stability of the blocking member in the gap and reduces the air that enters the gap to reduce the possibility of the cooling system generating the condensed liquid, thereby improving the blocking effect of the blocking member.

In a possible implementation, the blocking member is connected to the cooling system in the gap.

In this technical solution, it is possible to greatly reduce or prevent the air from entering between the blocking member and the cooling system, so as to better prevent the cooling system from generating the condensed liquid and further improve the blocking effect of the blocking member.

In a possible implementation, the material of the blocking member is a liquid absorbing material.

In this embodiment, even if a small amount of air contacts the cooling system to generate the condensed liquid, the blocking member can absorb the condensed liquid to prevent the condensed liquid from moving in the battery and reaching the busbar component or other components in the battery, which otherwise results in a safety hazard.

In a possible implementation, the blocking member has elasticity, and the blocking member is compressed between the insulation layer and the first face.

In this embodiment, the blocking member has elasticity, and can be conveniently installed in the gap between the two adjacent battery cell rows, and when the blocking member located in the gap is in a compressed state, there is a certain acting force between the blocking member and the battery cells, which can improve the installation stability and blocking effect of the blocking member in the gap. Further, in addition to being compressed and provided in the gap between the two adjacent battery cell rows, the blocking member is also compressed and provided between the insulation layer and the first face of the battery cell group, which can further improve the installation stability and blocking effect of the blocking member.

In a possible implementation, the insulation layer protrudes toward the opening to form the blocking member.

In this implementation, the blocking member can also be formed by reusing the original component in the battery, such as by the insulation layer, and it is not necessary to provide additional component for blocking, which can reduce the manufacturing cost.

In a possible implementation, the cross section of the blocking member in a plane perpendicular to the second direction is convex-shaped or a-shaped.

In a possible implementation, the blocking member is a strip-shaped blocking member that extends in the second direction.

In a second aspect, a power consuming apparatus is provided. The power consuming apparatus comprises a battery in the first aspect or any possible implementation of the first aspect for supplying electric energy.

In a third aspect, a method for manufacturing a battery is provided. The method comprises: providing a battery cell group comprising N battery cell rows arranged in a first direction, battery cells in each battery cell row of the N battery cell rows being arranged in a second direction, the first direction being perpendicular to the second direction, and N being an integer greater than 1; providing a signal transmission assembly provided on a first face of the battery cell group, the first face being parallel to a plane determined by the first direction and the second direction, the signal transmission assembly comprising a busbar component and an insulation layer, the insulation layer being used to enclose the busbar component, the insulation layer having holes, and the busbar component being configured to be electrically connected to the battery cells in the battery cell group at the holes; and providing a cooling system provided between two adjacent battery cell rows in the N battery cell rows, wherein a blocking member is provided at an opening, facing the first face, of a gap between the two adjacent battery cell rows, and is used to block the opening to prevent condensed liquid generated by the cooling system from reaching the busbar component.

In a fourth aspect, an apparatus for manufacturing a battery is provided. The apparatus comprises a module for performing the method according to the third aspect.

The technical solution of the embodiments of the present application provides a battery comprising a battery cell group, a signal transmission assembly and a cooling system. The cooling system can be provided between two adjacent battery cell rows in the battery cell group, and can be used to cool the battery cells in the battery cell group to prevent the battery cells from heating up and causing safety problems. Also, a blocking member is provided at an opening, at the first fat face of the battery cell group, of the gap between the two adjacent battery cell rows to prevent the condensed liquid generated by the cooling system from reaching the busbar component in the signal transmission assembly, which prevents the condensed liquid from causing problems such as short-circuiting and corrosion of the busbar component and thus prevents safety issues such as fires and explosions that can be caused by short-circuiting so as to improve the safety performance of the battery, and also solves battery life problems caused by corrosion so as to improve the overall life of the battery.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

Figure 1:
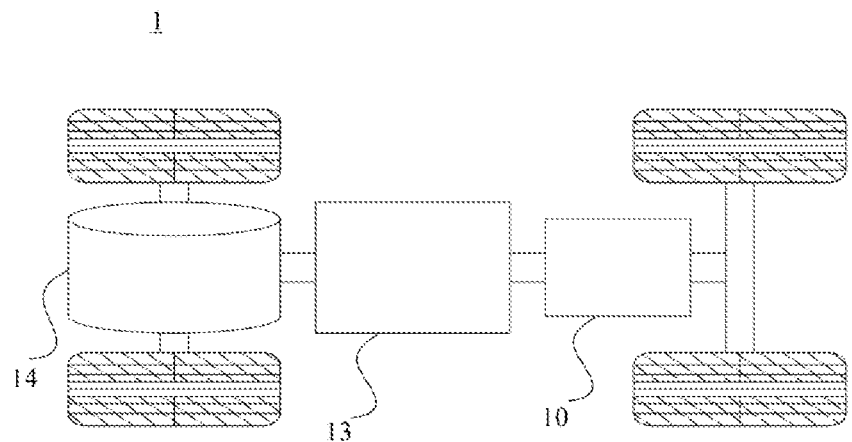
FIG. 1 is a schematic diagram of a vehicle according to an embodiment of the present application.

In the drawings, the figures are not drawn to actual scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example, but should not be used to limit the scope of the present application, that is, the present application is not limited to the described embodiments.

In the description of the present application, it should be noted that all technological and scientific terms used herein have the same meanings as those commonly understood by those skilled in the art to which the present application belongs. The terms used are merely for the purpose of describing specific embodiments, and are not intended to limit the present application. The terms "comprising" and "having" and any variations thereof in the specification and the claims of the present application and in the foregoing brief description of the drawings are intended to cover non-exclusive inclusions. The term "a plurality of" means two or more. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

In the present application, "embodiment" mentioned means that the specific features, structures and characteristics described in conjunction with the embodiments may be included in at least one embodiment of the present application. The phrase at various locations in the specification does not necessarily refer to the same embodiment, or an independent or alternative embodiment exclusive of another embodiment. Those skilled in the art should understand explicitly or implicitly that an embodiment described in the present application can be combined with another embodiment.

The orientation terms in the following description all indicate directions shown in the drawings, but do not limit the specific structure in the present application. In the description of the present application, it should also be noted that the terms "mounting", "connecting" and "connection" should be interpreted in a broad sense, unless explicitly specified and defined otherwise, which, for example, may be a fixed connection, a detachable connection or an integral connection, or may be a direct connection, an indirect connection by means of an intermediate medium, or the internal communication between two elements. For those of ordinary skill in the art, the specific meaning of the foregoing terms in the present application can be construed according to specific circumstances.

The term "and/or" in the present application is merely a description of the associated relationship of associated objects, representing that three relationships may exist, for example, A and/or B, may be expressed as: the three instances of A alone, both A and B, and B alone. In addition, the character "/" in the present application generally indicates that the associated objects before and after the character are in a relationship of "or".

In the present application, a battery cell may include a lithium ion secondary battery, a lithium ion primary battery, a lithium-sulfur battery, a sodium/lithium ion battery, a sodium ion battery or a magnesium ion battery, etc., which is not limited in the embodiments of the present application. The battery cell may be cylindrical, flat, cuboid or in another shape, which is not limited in the embodiments of the present application. The battery cells are generally classified into three types depending on the way of package: cylindrical battery cells, prismatic battery cells and pouch battery cells, which are also not limited in the embodiments of the present application.

A battery mentioned in the embodiments of the present application refers to a single physical module comprising one or more battery cells to provide a higher voltage and capacity. For example, the battery mentioned in the present application may comprise a battery pack, etc. The battery generally comprises a case for enclosing one or more battery cells. The case can prevent liquid or other foreign matters from affecting the charging or discharging of the battery cell.

The battery cell comprises an electrode assembly and an electrolytic solution, the electrode assembly being composed of a positive electrode plate, a negative electrode plate, and a separator. The battery cells operate mainly by means of metal ions moving between the positive electrode plate and the negative electrode plate. The positive electrode plate comprises a positive electrode current collector and a positive electrode active material layer, the positive electrode active material layer being covered on a surface of the positive electrode current collector, with the current collector not covered with the positive electrode active material layer protruding from the current collector covered with the positive electrode active material layer, and the current collector not covered with the positive electrode active material layer serving as a positive electrode tab. Taking a lithium ion battery as an example, the positive electrode current collector may be made of aluminum, and a positive electrode active material may be lithium cobalt oxide, lithium iron phosphate, ternary lithium, lithium manganate, etc. The negative electrode plate comprises a negative electrode current collector and a negative electrode active material layer, the negative electrode active material layer being covered on a surface of the negative electrode current collector, the current collector not covered with the negative electrode active material layer protruding from the current collector covered with the negative electrode active material layer, and the current collector not covered with the negative electrode active material layer serving as a negative electrode tab. The negative electrode current collector may be made of copper, and a negative electrode active material may be carbon, silicon, etc. In order to ensure that no fusing occurs when a large current passes, a plurality of positive electrode tabs are provided and are stacked together, and a plurality of negative electrode tabs are provided and are stacked together. The separator may be of a material such as polypropylene (PP), polyethylene (PE), etc. In addition, the electrode assembly may be of a wound structure or a laminated structure, which is not limited in the embodiments of the present application.

The battery may comprise a plurality of battery cells in order to meet different power demands, with the plurality of battery cells being in series connection, parallel connection or series-parallel connection. The series-parallel connection refers to a combination of series connection and parallel connection. Optionally, the plurality of battery cells may be in series connection or in parallel connection or in series-parallel connection to constitute a battery module, and then a plurality of battery modules may in series connection or in parallel connection or in series-parallel connection to constitute the battery. That is to say, the plurality of battery cells may directly form a battery, or may form battery modules that may then form a battery. The battery is further provided in a power consuming apparatus to supply electric energy to the power consuming apparatus.

The development of battery technology needs to consider many design factors at the same time, such as energy density, cycle life, discharge capacity, charge-discharge rate, and other performance parameters, and also needs to consider the safety of the battery.

For battery cells, the main safety hazard comes from the charging and discharging process, and thus a proper temperature design is also provided. In order to control the battery cells to be at a proper temperature, a cooling system may be provided in the battery. The cooling system is used to accommodate a cooling medium to cool the battery cells. The cooling system may also be referred to as a cooling component, a cooling plate, etc., and the cooling medium may also be referred to as a cooling fluid, and more specifically, may be referred to as a cooling liquid or a cooling gas. The cooling fluid circulates to achieve a better temperature regulation effect. Optionally, the cooling medium may be water, a mixture of water and ethylene glycol, air, etc. If the cooling medium is water, the cooling system may also be referred to as a water cooling plate.

The case of the battery may be shaped depending on the plurality of battery cells accommodated. In some embodiments, the case may be square with six walls. Optionally, a bottom wall and a top wall of the case may be provided with the above cooling system integrated thereon to respectively cool the battery cells at the bottom and the top of the case. Each side wall of the case is provided with a beam comprising a plurality of sub-walls that form a hollow beam structure, i.e., the beam has a chamber inside. Optionally, in addition to the bottom and the top of the case, the cooling system may also be provided in the middle of the case, for example, among a plurality of battery cells, to further enhance the cooling effect.

When the battery is in a high-temperature and high-humidity environment, it is easy to generate condensed liquid in a case of the battery, which will cause a potential safety hazard to affect the safety of the battery. Specifically, when the high-temperature and high-humidity gas in the battery meets the cooling system in the case of the battery, condensed liquid may be generated and may affect the safety of the battery if it drips to electrical connection regions in the battery.

In view of this, the present application provides a technical solution, in which a blocking member is provided in a gap between the battery cells to prevent the condensed liquid generated by the cooling system among the battery cells from reaching the electrical connection region in the battery, which otherwise affects the electrical connection region, thereby enhancing the safety of the battery.

In the case of the battery, in addition to the battery cells and the cooling component mentioned above, a busbar component and other components of the battery may be provided. In some embodiments, a structure for fixing the battery cells may further be provided in the case.

The busbar component is used to achieve the electrical connection, such as parallel connection, series connection, or series-parallel connection, between the plurality of battery cells. The busbar component may achieve the electrical connection between the battery cells by means of connecting electrode terminals of the battery cells. In some embodiments, the busbar component may be fixed to the electrode terminals of the battery cells by means of welding. The electrical connection formed by the busbar component may also be referred to as "high-voltage connection".

In addition to the busbar component, the battery may further be internally provided with a sensing device for sensing the state of the battery cells, for example, sensing the temperature, the state of charge, etc. of the battery cells. In the embodiments of the present application, the electrical connection region in the battery may comprise an electrical connection region formed by the busbar component and/or an electrical connection region in the sensing device.

The busbar component and the sensing device may be enclosed in an insulation layer to form a signal transmission assembly. Accordingly, the signal transmission assembly may be used for transmission of the voltage and/or sensing signals of the battery cells. The signal transmission assembly has no insulation layer at the connections with the electrode terminals of the battery cells, that is, the insulation layer has holes at the connections and is thus connected to the electrode terminals of the battery cells.

A pressure balancing mechanism may further be provided on the case of the battery for balancing the pressures inside and outside the case. For example, when the pressure inside the case is higher than the pressure outside the case, the gas inside the case may flow out of the case by means of the pressure balancing mechanism; and when the pressure inside the case is lower than the pressure outside the case, the gas outside the case may flow into the case by means of the pressure balancing mechanism.

It should be understood that the components in the battery case described above should not be construed as a limitation on the embodiments of the present application, that is to say, the case for the battery of the embodiments of the present application may or may not comprise the components described above.

The technical solutions described in the embodiments of the present application are all applicable to various apparatuses using a battery, such as mobile phones, portable apparatuses, laptops, battery cars, electric toys, electric tools, electric vehicles, ships and spacecraft. For example, the spacecrafts include airplanes, rockets, space shuttles, space vehicles, etc.

It should be understood that the technical solutions described in the embodiments of the present application are not only applicable to the devices described above, but also applicable to all apparatuses using a battery. However, for the sake of brevity of description, the following embodiments will be described taking an electric vehicle as an example.

For example, FIG. 1 shows a schematic structural diagram of a vehicle 1 according to an embodiment of the present application. The vehicle 1 may be a fuel vehicle, a gas vehicle or a new-energy vehicle. The new-energy vehicle may be a battery electric vehicle, a hybrid vehicle, an extended-range vehicle, etc. The interior of the vehicle 1 may be provided with a motor 14, a controller 13 and a battery 10. The controller 13 is used to control the battery 10 to supply power to the motor 14. For example, the battery 10 may be provided at the bottom or the head or the tail of the vehicle 1. The battery 10 may be used to supply power to the vehicle 1. For example, the battery 10 can serve as a power source for operating the vehicle 1 for use in a circuit system of the vehicle 1, for example, to meet the working power demand of the vehicle 1 during startup, navigation and running. In another embodiment of the present application, the battery 10 can not only serve as a power source for operating the vehicle 1, but also serve as a power source for driving the vehicle 1, instead of or partially instead of fuel or natural gas, to provide driving power for the vehicle 1.

Figure 2:
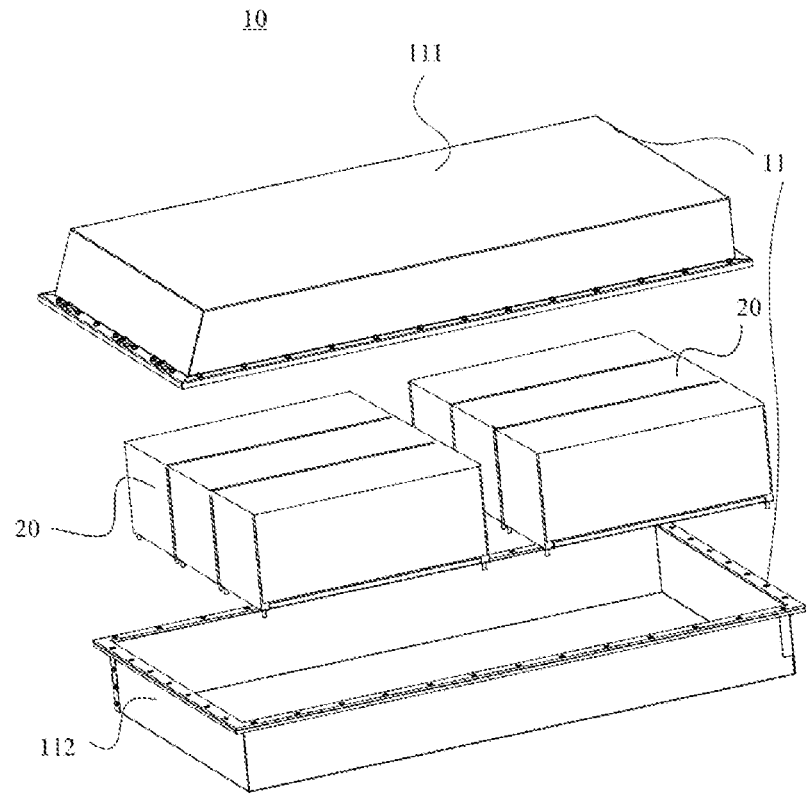
FIG. 2 is a schematic diagram of a battery according to an embodiment of the present application.

The battery 10 may comprise a plurality of battery cells in order to meet different power demands. For example, FIG. 2 shows a schematic structural diagram of a battery 10 according to an embodiment of the present application. The battery 10 may comprise a plurality of battery cells 20. The battery 10 may further comprise a case 11. The case 11 has a hollow structure inside, and the plurality of battery cells 10 are accommodated in the case 11. As shown in FIG. 2, the case 11 may comprise two portions, respectively referred to herein as a first portion 111 (an upper case) and a second portion 112 (a lower case). The first portion 111 and the second portion 112 are snap-fitted together. The first portion 111 and the second portion 112 may be shaped depending on the shape of a combination of the plurality of battery cells 20, and each of the first portion 111 and the second portion 112 has an opening. For example, the first portion 111 and the second portion 112 may both be a hollow cuboid and each have only one open face, an opening of the first portion 111 and an opening of the second portion 112 are disposed opposite to each other, and the first portion 111 and the second portion 112 are snap-fitted to each other to form the case 11 having an enclosed chamber. The plurality of battery cells 20 are combined in parallel connection or in series connection or in series-parallel connection, and then placed in the case 11 that is formed after the first portion 111 and the second portion 112 are snap-fitted together.

Optionally, the battery 10 may further comprise other structures, which will not be described in detail herein. For example, the battery 10 may further comprise a busbar component that are used to achieve electrical connection, such as parallel connection or series connection or series-parallel connection, between the plurality of battery cells 20. Specifically, the busbar component may achieve the electrical connection between the battery cells 20 by means of connecting electrode terminals of the battery cells 20. Further, the busbar component may be fixed to the electrode terminals of the battery cells 20 by means of welding. The electric energy of the plurality of battery cells 20 may be further extracted by means of an electrically conductive mechanism passing through the case 11. Optionally, the electrically conductive mechanism may also be a busbar component.

The number of the battery cells 20 may be set as any value depending on different power demands. The plurality of battery cells 20 may be in series connection, in parallel connection or in series-parallel connection to achieve higher capacity or power. Since each battery 10 may comprise a large number of the battery cells 20. For ease of mounting, the battery cells 20 may be provided in groups, and each group of battery cells 20 forms a battery module. The number of the battery cells 20 included in the battery module is not limited and may be set as required. The battery may comprise a plurality of battery modules that may be in series connection, in parallel connection or in series-parallel connection.

Figure 3:
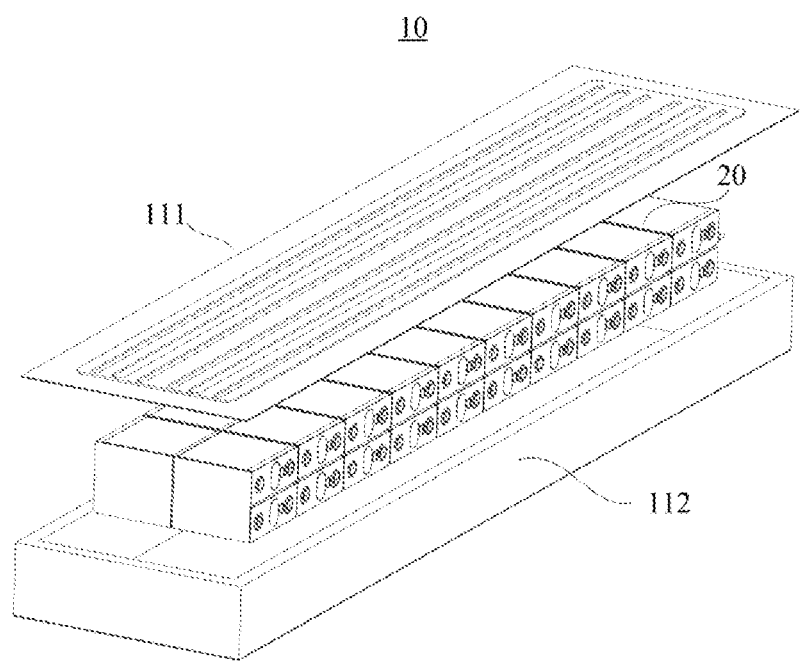
FIG. 3 is a schematic diagram of a battery according to an embodiment of the present application.

Optionally, as shown in FIG. 3, the first portion 111 of the case 11 may be an upper cover having no opening, i.e., the first portion 111 is a flat plate-shaped upper cover. The upper cover may be provided with a cooling component integrated thereon to cool the battery cells 20 at the top of the case 11. The second portion 112 of the case 11 is a chamber having an opening, and comprises a bottom wall and side walls. The bottom wall may be provided with a cooling component integrated thereon to cool the battery cells 20 at the bottom of the case 11. Each side wall may be provided with a beam comprising a plurality of sub-walls that form a hollow beam structure, i.e., the beam has a chamber inside.

Optionally, in addition to the bottom and top of the case 11, a cooling component may further be provided in the middle of the case 11. For example, a cooling component may also be provided between upper and lower rows of battery cells 20 to further enhance the cooling effect.

Optionally, the wall, provided with an electrode terminal, of the battery cell 20 in the case 11 may be perpendicular to the bottom wall of the case 11. That is to say, the battery cells 20 may be disposed horizontally ("lying flat"). In this way, a cooling component may be provided between every two rows of battery cells 20 in a direction perpendicular to the bottom wall of the case 11, and correspondingly, a cooling component may be provided on either of each battery cell 20. Optionally, the side wall having the largest area of each battery cell 20 is connected to a cooling component, thereby cooling the battery cells 20 to a greater extent.

Figure 4:
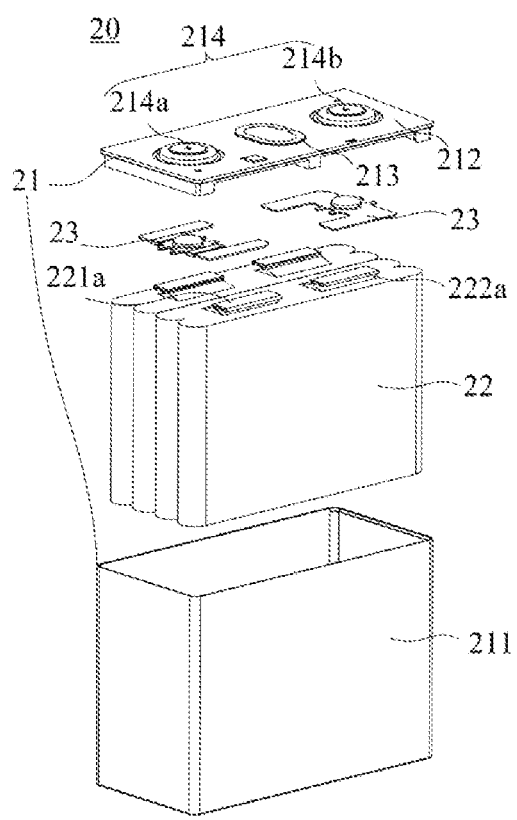
FIG. 4 is a schematic diagram of a battery cell according to an embodiment of the present application.

FIG. 4 shows a schematic structural diagram of a battery cell 20 according to an embodiment of the present application. The battery cell 20 comprises one or more electrode assemblies 22, a housing 211, and a cover plate 212. The housing 211 and the cover plate 212 form a shell or a battery box 21. Walls of the housing 211 and the cover plate 212 are both referred to as walls of the battery cell 20. For a cuboid battery cell 20, the walls of the housing 211 include a bottom wall and four side walls. The housing 211 may be determined depending on the shape of a combination of the one or more electrode assemblies 22, for example, the housing 211 may be a hollow cuboid, cube or cylinder, with one of the faces of the housing 211 having an opening such that the one or more electrode assemblies 22 can be disposed in the housing 211. For example, when the housing 211 is a hollow cuboid or cube, one of the flat faces of the housing 211 is an open face, that is, this flat face has no wall such that the inside of the housing 211 is in communication with the outside. When the housing 211 may be a hollow cylinder, an end face of the housing 211 is an open face, that is, this end face has no wall such that the inside of the housing 211 is in communication with the outside. The cover plate 212 covers the opening and is connected to the housing 211 to form an enclosed chamber in which the electrode assemblies 22 are disposed. The housing 211 is filled with an electrolyte, such as an electrolytic solution.

The battery cell 20 may further comprise two electrode terminals 214, and the two electrode terminals 214 may be provided on the cover plate 212. The cover plate 212 is generally in the form of a flat plate, the two electrode terminals 214 are fixed to a flat plate face of the cover plate 212, and the two electrode terminals 214 are respectively a positive electrode terminal 214*a* and a negative electrode terminal 214*b*. Each electrode terminal 214 is correspondingly provided with a connecting member 23 which, also referred to as a current collecting member 23, is located between the cover plate 212 and the electrode assembly 22 to achieve the electrical connection between the electrode assembly 22 and the electrode terminal 214.

As shown in FIG. 4, each electrode assembly 22 has a first tab 221*a* and a second tab 222*a*. The first tab 221*a* and the second tab 222*a* have opposite polarities. For example, when the first tab 221*a* is a positive electrode tab, the second tab 222*a* is a negative electrode tab. The first tab 221*a* of the one or more electrode assemblies 22 is connected to an electrode terminal by means of a connecting member 23, and the second tab 222*a* of the one or more electrode assemblies 22 is connected to another electrode terminal by means of another connecting member 23. For example, the positive electrode terminal 214*a* is connected to the positive electrode tab by means of a connecting member 23, and the negative electrode terminal 214*b* is connected to the negative electrode tab by means of another connecting member 23.

In the battery cell 20, according to the demands in actual use, one or more electrode assemblies 22 may be provided. As shown in FIG. 4, four independent electrode assemblies 22 are provided in the battery cell 20.

A pressure relief mechanism 213 may also be provided on the battery cell 20. The pressure relief mechanism 213 is used to be actuated, when the internal pressure or temperature of the battery cell 20 reaches a threshold, to relieve the internal pressure or temperature.

The pressure relief mechanism 213 may be of a variety of possible pressure relief structures, which are not limited in the embodiments of the present application. For example, the pressure relief mechanism 213 may be a temperature-sensitive pressure relief mechanism that is configured to melt when the internal temperature of the battery cell 20 provided with the pressure relief mechanism 213 reaches a threshold; and/or the pressure relief mechanism 213 may be a pressure-sensitive pressure relief mechanism that is configured to fracture when the internal gas pressure of the battery cell 20 provided with the pressure relief mechanism 213 reaches a threshold.

Figure 5:
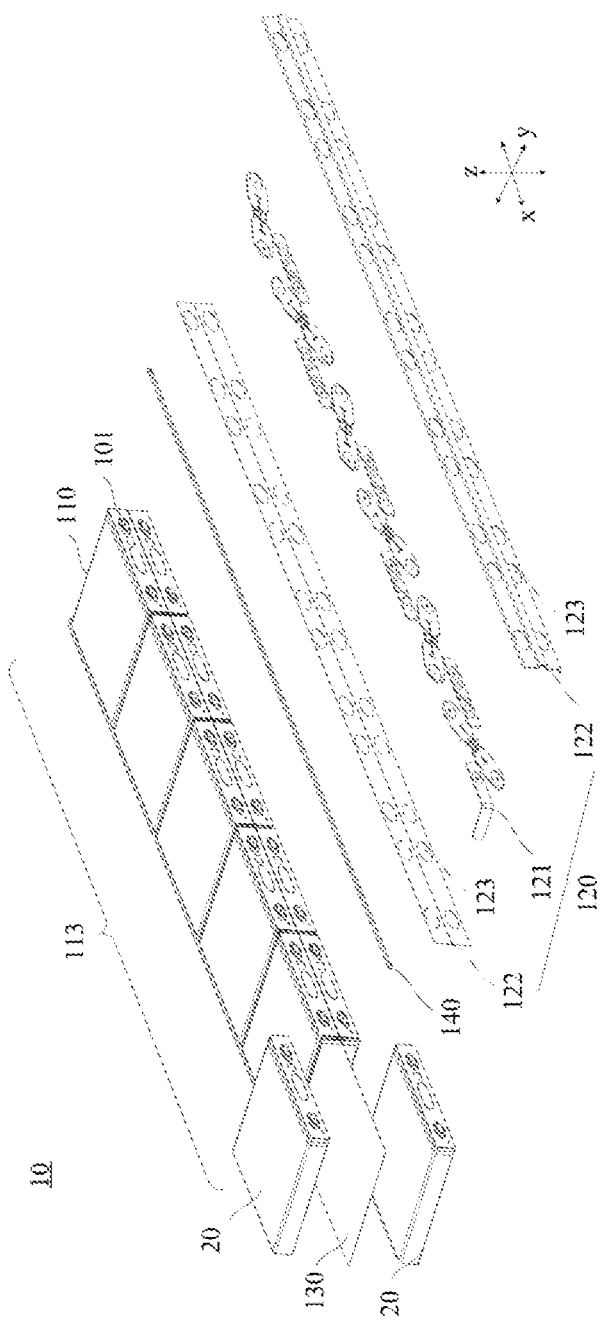
FIG. 5 is a schematic exploded diagram of a battery according to an embodiment of the present application.

FIG. 5 shows a schematic exploded diagram of a battery 10 provided in an embodiment of the present application.

As shown in FIG. 5, the battery 10 comprises: a battery cell group 110, the battery cell group 110 comprising N battery cell rows 113, the N battery cell rows 113 being arranged in a first direction, battery cells 20 in each battery cell row 113 in the N battery cell rows 113 being arranged in a second direction, the first direction being perpendicular to the second direction, and N being an integer greater than 1.

For illustration, in FIG. 5, the z-direction is the first direction, and the x-direction is the second direction. In the x-direction, a plurality of battery cells 20 are arranged to form a battery cell row 113, and in the z-direction, N battery cell rows 113 are arranged in sequence. In the embodiment shown in FIG. 5, it schematically shows that two battery cell rows 113 are sequentially arranged in the z-direction.

Optionally, in some embodiments, the z-direction may be a direction perpendicular to the ground level. When the battery cell group 110 is provided on the ground level, the N battery cell rows 113 in the battery cell group 110 are stacked in the z-direction.

Continuing to refer to FIG. 5, the battery 10 of the embodiment of the present application further comprises: a signal transmission assembly 120 provided on a first face 101 of the battery cell group 110, the first face 101 being parallel to a plane determined by the first direction and the second direction, the signal transmission assembly 120 comprising a busbar component 121 and an insulation layer 122, the insulation layer 122 being used to enclose the busbar component 121, the insulation layer 122 having holes 123, and the busbar component 121 being configured to be electrically connected to the battery cells 20 in the battery cell group 110 at the holes 123.

Specifically, in the embodiment shown in FIG. 5, the battery cell 20 in the battery cell group 110 can be approximately understood as a block-shaped battery cell, for example, it can be a cubic structure or a cuboid structure. The face of the battery cell 20 on which the electrode terminal 214 is provided may be referred to as a first face of the battery cell 20, and when a plurality of battery cells 20 are arranged in the x-direction to form a battery cell row 113, the plurality of first faces of the plurality of battery cells 20 are joined together to form a large flat face, which is referred to as a first face of a battery cell row 113. Further, when the N battery cell rows 113 are arranged in the z-direction to form the battery cell group 110, the first faces of the N battery cell rows 113 are joined together to form a larger flat face, which is referred to as a first face 101 of the battery cell group 110, the first face of the battery cell group 110 being parallel to the plane defined by the z-direction and the x-direction. That is, in the embodiment of the present application, the first face 101 of the battery cell group 110 is parallel to the xz-plane.

Further, on the first flat face 101 of the battery cell group 110, the signal transmission assembly 120 of the battery 10 is provided. Specifically, the signal transmission assembly 120 comprises a busbar component 121 and an insulation layer 122, the busbar component 121 can be connected to the electrode terminals of the plurality of battery cells and used for transmission of electric energy of the plurality of battery cells 20. Since the busbar component 121 is used for transmission of electric energy of the plurality of battery cells 20, the transmission performance and safety performance are very important for the battery 10. Therefore, the signal transmission assembly 120 further comprises an insulation layer 122 for enclosing the busbar component 121, which reduces the influence of external environmental factors on the busbar component 121 to ensure the transmission performance and safety performance of the busbar component 121. However, in order to realize the electrical connection between the busbar component 121 and the electrode terminals of the plurality of battery cells 20, the insulation layer 122 is provided with holes 123 formed therein, and the busbar component 121 is configured to be electrically connected to the electrode terminals 214 of the battery cells 20 in the battery cell group 110 at the holes 123.

Continuing to refer to FIG. 5, the battery 10 of the embodiment of the present application further comprises: a cooling system 130 provided between two adjacent battery cell rows 113 in the N battery cell rows 113, with a blocking member 140 being provided in at an opening, facing the first flat face 101 of the battery cell group 110, of a gap between two adjacent battery cell rows 113 to prevent the condensed liquid generated by the cooling system 130 from reaching the busbar component 121.

Optionally, in the embodiment shown in FIG. 5, the cooling system 130 may comprise a cooling plate, which may be provided between two adjacent battery cell rows 113 in the N battery cell rows 113 and may be provided perpendicular to the first flat face 101 of the battery cell group 110.

Based on this technical solution, the cooling system 130 is provided between two adjacent battery cell rows 113, and can cool the battery cells 20 in the two adjacent battery cell rows 113. Optionally, the cooling system 130 may comprise a cooling plate that has a larger corresponding area with the battery cells 20 in the two adjacent battery cell rows 113 and has a better cooling effect on the battery cells 20.

As shown in FIG. 5, in order to reduce the influence of the condensed liquid formed on the cooling system 130 on the signal transmission assembly 120 (especially the busbar component 121 in the signal transmission assembly 120) provided on the first face 101 of the battery cell group 110, the cooling system 130 does not abut with the first face 101 of the battery cell group 110, so that there is a gap between two adjacent battery cell rows 113.

In order to further reduce the influence of the condensed liquid formed on the cooling system 130 on the busbar component 121 in the signal transmission assembly 120, a blocking member 140 is provided at the opening, in the first flat face 101 of the battery cell group 110, of the gap between the two adjacent battery cell rows 113, in other words, is provided at the opening, in the first flat face 101 of the battery cell group 110, of the gap between two adjacent battery cell rows 113 to prevent the condensed liquid generated by the cooling system 130 from reaching the busbar component 121. Specifically, the blocking member 140 can block the condensed liquid generated by the cooling system 130 from reaching the busbar component 121 at the holes 123 of the insulation layer 122 to prevent the condensed liquid from causing problems such as short-circuiting and corrosion of the busbar component 121.

Based on the above technical solution, the embodiment of the present application provides a battery 10, comprising a battery cell group 110, a signal transmission assembly 120, and a cooling system 130, wherein the signal transmission assembly 120 comprises a busbar component 121 for transmission of electric energy of the battery cell group 113 and an insulation layer 122 for enclosing the busbar component 121. The insulation layer 122 can be provided to reduce the influence of external environmental factors on the busbar component 121 to ensure the transmission performance and safety performance of the busbar component 121. In order to realize the electrical connection between the busbar component 121 and the battery cell group 110, the insulation layer 122 is provided with an holes 123, and the busbar component 121 is configured to be electrically connected to the battery cells 20 in the battery cell group 110 at the holes 123. In addition, the cooling system 130 can be provided between two adjacent battery cell rows 113 in the battery cell group 110, and can be used to cool the battery cells 20 in the battery cell group 110 to prevent the battery cells 20 from heating up and causing safety problems. Also, a blocking member 140 is provided at an opening, in the first flat face 101 of the battery cell group 110, of the gap between the two adjacent battery cell rows 113 to prevent the condensed liquid generated by the cooling system 130 from reaching the busbar component 121 in the signal transmission assembly 120, which prevents the condensed liquid from causing problems such as short-circuiting and corrosion of the busbar component 121 and thus prevents safety issues such as fires and explosions that can be caused by short-circuiting, and also solves battery performance and life problems caused by corrosion.

It can be understood that FIG. 5 only illustrates the case where the battery cell group 110 comprises two battery cell rows 113 arranged in the z-direction by way of example. In addition, in the z-direction, the battery cell group 110 may further comprise more battery cell rows 113, and a cooling system 130 may be provided between every two adjacent battery cell rows 113, or a cooling system 130 may be provided between some of two adjacent battery cell rows 113.

It can also be understood that, in FIG. 5, in addition to the x-direction and the z-direction described above, a y-direction perpendicular to the x-direction and the z-direction may further be provided in the three-dimensional space. Optionally, the battery 10 in the embodiment of the present application may comprise a plurality of battery cell groups 113, and the plurality of battery cell groups 113 may be arranged in the y-direction. Optionally, two battery cell groups 113 adjacent in the y-direction may be provided in a mirror-image manner.

The basic technical solution of the battery 10 provided in the embodiment of the present application is described above in conjunction with FIG. 5. The related technical solutions of the components in the battery 10 of the embodiment of the present application will be described below in conjunction with FIGS. 6 to 9.

Figure 6:
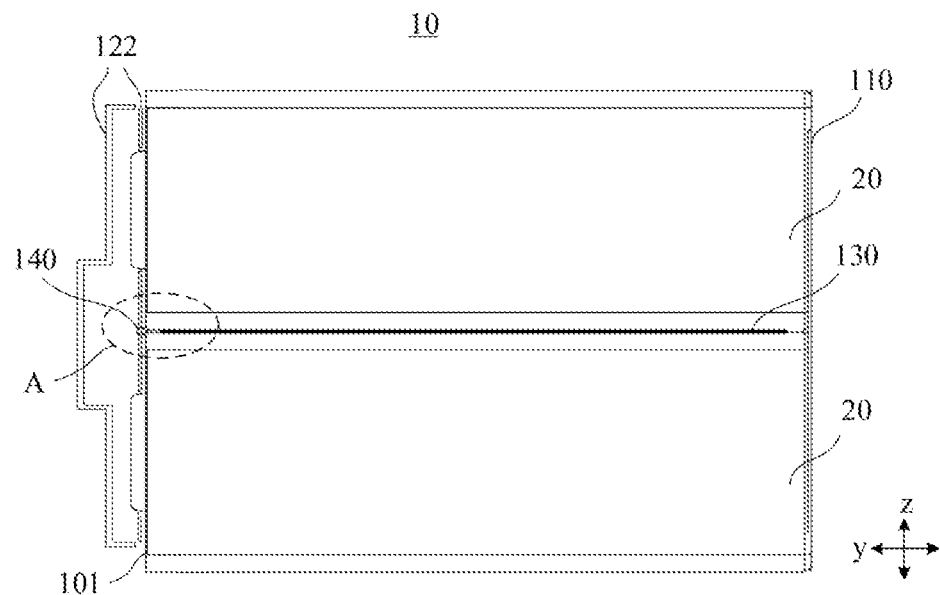
FIG. 6 is a schematic cross-sectional diagram of a battery according to an embodiment of the present application.

FIG. 6 shows a schematic cross-sectional diagram of the battery 10 provided in an embodiment of the present application. Optionally, the cross-sectional diagram shown in FIG. 6 may be a schematic cross-sectional diagram of the battery 10 in FIG. 5 in the yz-plane.

As shown in FIG. 6, the signal transmission assembly 120 comprises two insulation layers 122, a busbar component 121 (not shown in FIG. 6) is provided between the two insulation layers 122, and the two insulation layers 122 are used to cover the busbar component 121 so as to enclose the busbar component 121.

Optionally, in addition to the busbar component 121, the signal transmission assembly 120 further comprises a sensing component (not shown). Similarly, the sensing component is provided between the above two insulation layers, and the two insulation layers 122 are also used to cover the sensing component so as to enclose the sensing component. As an example, the sensing component may comprise a sensor and a transmission line. The sensor comprises, but is not limited to, a sensor for sensing the temperature, voltage, current and other state signals of the battery cell 20, the state signals of the battery cell 20 sensed by the sensor being transmitted through the transmission line. The transmission line may be, for example, an electrical signal transmission line or a flexible circuit board.

It can be understood that, in addition to the busbar component 121 and the sensing component, the signal transmission assembly 120 may further comprise other electrical components, and the two-layer insulation layer 122 can also be used to enclose the other electrical components, and the specific types of the electrical components are not limited in this embodiment of the present application.

As an example, in the embodiment of the present application, the signal transmission assembly 120 may be a hot-pressed cell connection system (CCS) to realize the signal transmission of the battery cell group 110.

Continuing to refer to FIG. 6, the cooling system 130 is a cooling plate. In the z-direction, the size of the cooling system 130 can be equal to or similar to the gap between two adjacent battery cell rows 113, and the large face of the cooling system 130 can be in contact with the battery cells 20 for cooling the battery cells 20.

In the y-direction, the size of the cooling system 130 may be smaller than that of the battery cells 20. Therefore, there is a gap between two adjacent battery cell rows 113, and a blocking member 140 is provided at an opening of the gap in the first face 101 to block the condensed liquid generated by the cooling system 130.

As can be seen in conjunction with FIGS. 5 and 6, the gap between the two adjacent battery cell rows 113 extends in the x-direction, and correspondingly, the blocking member 140 may be a strip-shaped blocking member. The strip-shaped blocking member extends in the x-direction, and has a length that may be close to or equal to the length of each battery cell row 113 in the x-direction.

Figure 7:
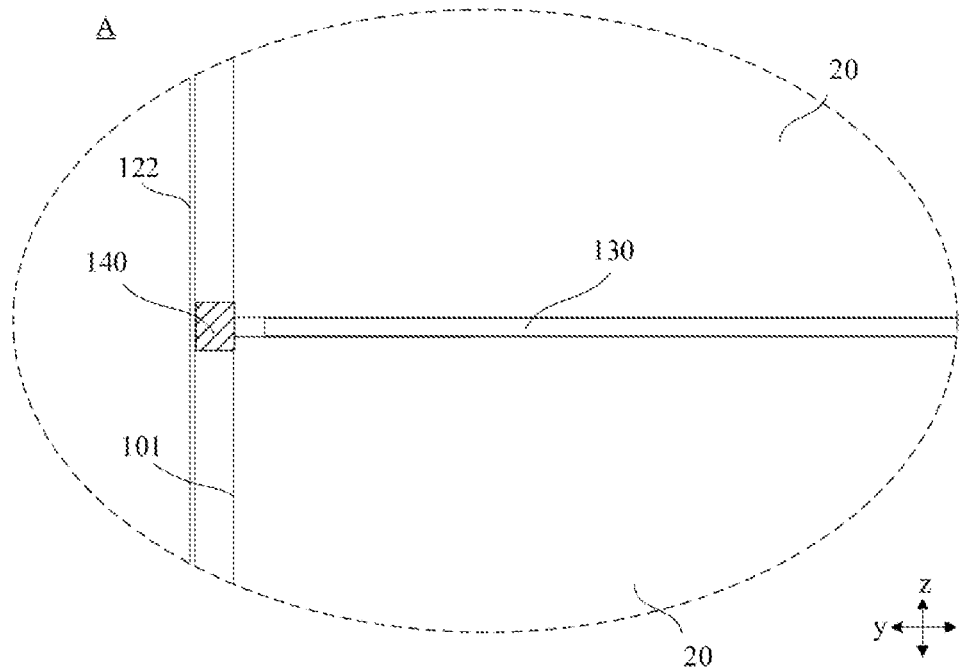
FIG. 7 is a schematic partial enlarged diagram of a region where a blocking member is located in FIG. 6.

FIG. 7 shows a schematic partial enlarged diagram of the region (region A) where the blocking member 140 is located in FIG. 6.

As shown in FIG. 7, in this embodiment, the blocking member 140 is blocked outside the gap and tightly attached to the first face 101 of the battery cell group 110 to block the opening of the gap at the first face 101.

Figure 8:
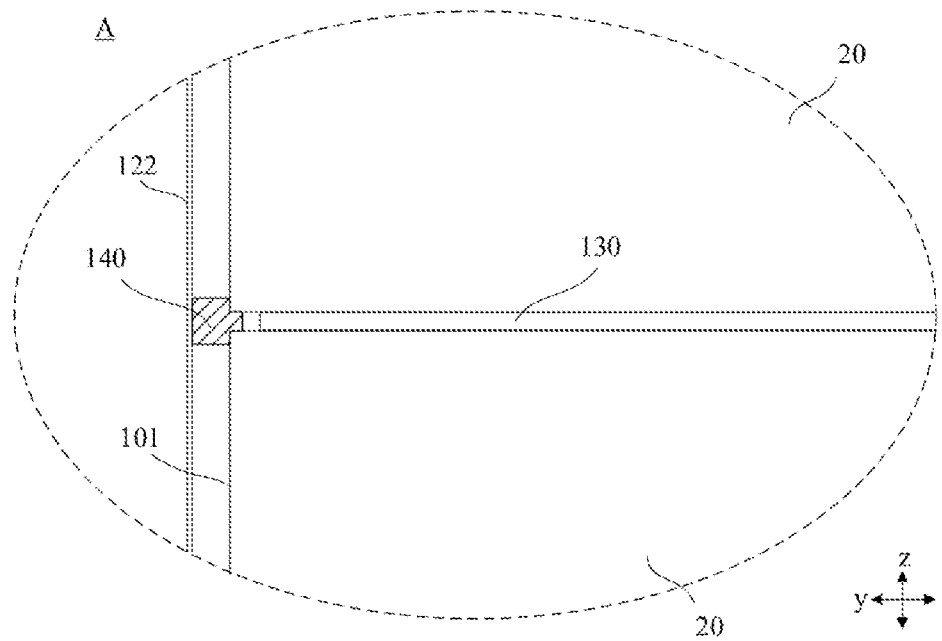
FIG. 8 is a schematic partial enlarged diagram of a region where a blocking member is located in FIG. 6.
Figure 9:
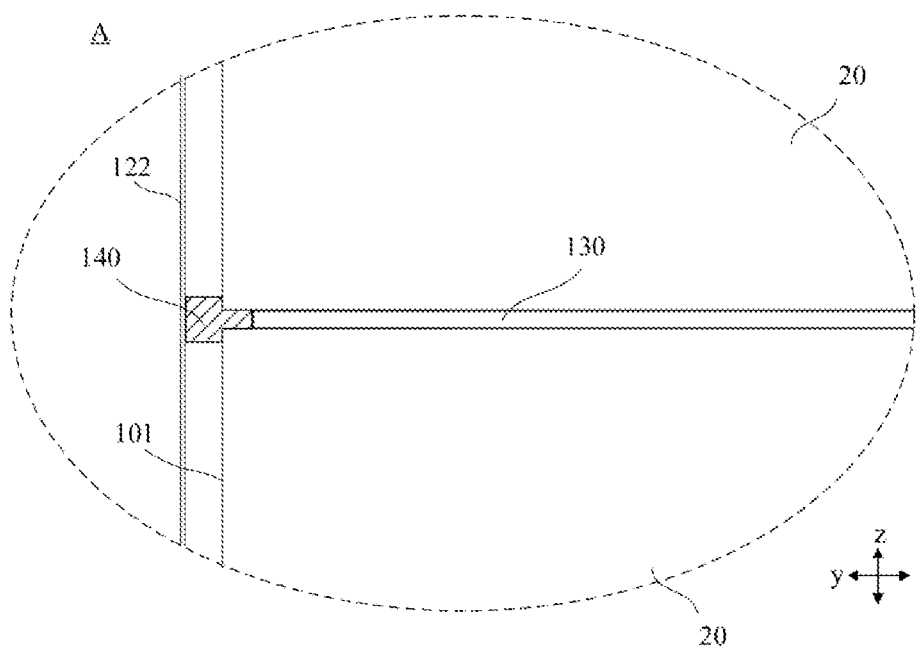
FIG. 9 is a schematic partial enlarged diagram of a region where a blocking member is located in FIG. 6.

Alternatively, in other embodiments, FIGS. 8 and 9 show other two schematic partial enlarged diagrams of the region (region A) where the blocking member 140 is located in FIG. 6.

As shown in FIG. 8, the blocking member 140 extends into the gap between two adjacent battery cell rows 113, which improves the stability of the blocking member 140 in the gap and reduces the air that enters the gap to reduce the possibility of the cooling system 130 generating the condensed liquid, thereby improving the blocking effect of the blocking member 140.

As shown in FIG. 9, the blocking member 140 extends into the gap between two adjacent battery cell rows 113 and is connected to the cooling system 130. In this technical solution, it is possible to greatly reduce or prevent the air from entering between the blocking member 140 and the cooling system 130, so as to better prevent the cooling system 130 from generating the condensed liquid and improve the blocking effect of the blocking member 140.

Optionally, in the above embodiment of the present application, the blocking member 140 may be a liquid absorbing material for absorbing the condensed liquid formed in the cooling system 130. In this embodiment, even if a small amount of air contacts the cooling system 130 to generate the condensed liquid, the blocking member 140 can absorb the condensed liquid to prevent the condensed liquid from moving in the battery 10 and reaching the busbar component 121 or other components in the battery 10, which otherwise results in a safety hazard.

Optionally, in the above embodiment of the present application, the blocking member 140 may have elasticity, and can be conveniently installed in the gap between two adjacent battery cell rows 113, and when the blocking member 140 located in the gap is in a compressed state, there is a certain acting force between the blocking member and the battery cell 20, which can improve the installation stability and blocking effect of the blocking member 140 in the gap.

In some possible embodiments, the part of the blocking member 140 located in the gap between two adjacent battery cell rows 113 is in a compressed state, while the part of the blocking member 140 located outside the gap is in a non-compressed state.

In other possible embodiments, the entire blocking member 140 is in a compressed state. As an example, as shown in FIGS. 7 to 9, the blocking member 140 is compressed between the insulation layer 122 in the signal transmission assembly 120 and the first face 101 of the battery cell group 110.

In this embodiment, in addition to being compressed and provided in the gap between the two adjacent battery cell rows 113, the blocking member 140 is also compressed and provided between the insulation layer 122 and the first face 101 of the battery cell group 110, which can further improve the installation stability and blocking effect of the blocking member 140.

It can be understood that, in the embodiment of the present application, in addition to being compressed between the insulation layer 122 in the signal transmission assembly 120 and the first face 101 of the battery cell group 110, the blocking member 140 may also be compressed between other component and the first face 101 of the battery cell group 110, which will not be specifically limited in the embodiments of the present application.

Optionally, in the above embodiment of the present application, the blocking member 140 is made of a material including, but not limited to, foam which may have a liquid absorption capacity and/or elasticity, has a low cost, and can be well applied to the battery 10 provided in the present application.

In the above embodiment, the blocking member 140 may be an independent component and is installed in the gap between two adjacent battery cell rows 113. In other embodiments, the blocking member 140 may also be formed by reusing the original component in the battery 10, and it is not necessary to provide additional component for blocking, which can reduce the manufacturing cost.

Figure 10:
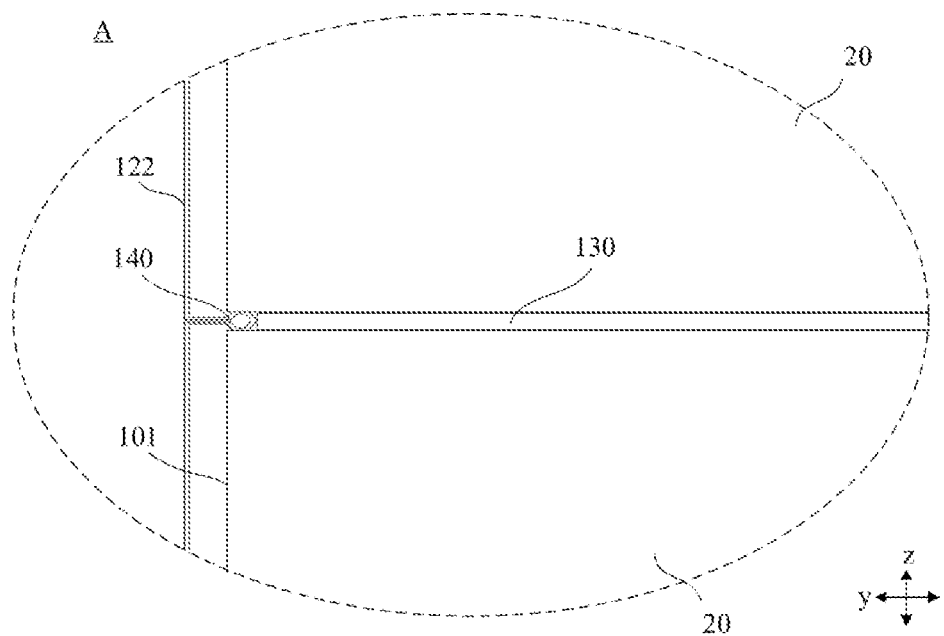
FIG. 10 is a schematic partial enlarged diagram of a region where a blocking member is located in FIG. 6.

FIG. 10 shows another schematic partial enlarged diagram of the region (region A) where the blocking member 140 is located in FIG. 6.

As shown in FIG. 10, in the embodiment of the present application, the insulation layer 122 in the signal transmission assembly 120 protrudes toward the first face 101 of the battery cell group 110 to form the blocking member 140. Specifically, the insulation layer 122 protrudes toward the opening in the first face 101 to form the blocking member 140, and the opening is an opening, in the first face 101, of the gap between two adjacent battery cell rows 113.

As can be seen in conjunction with FIGS. 6 and 10, in the embodiment of the present application, in the two insulation layers 122 of the signal transmission assembly 120, a part of region of the insulation layer 122 close to the first face 101 protrudes to form wrinkles, and the protruding wrinkles form the blocking member 140 in the embodiment of the present application.

Optionally, in some embodiments, the cross section of the blocking member 140 in a plane perpendicular to the second direction is approximately a-shaped. For example, as shown in FIG. 10, the plane perpendicular to the second direction (i.e., the x-direction) is the yz-plane, and the cross section of the blocking member 140 is approximately a-shaped in the yz-plane.

Alternatively, in other embodiments, the cross section of the blocking member 140 in a plane perpendicular to the second direction may also be in other shapes, such as in the shape of a hollow square, in a convex shape, or in any other shape, which shall not be specifically limited in the embodiments of the present application.

Optionally, as shown in FIG. 10, the blocking member 140 may extend into the gap between two adjacent battery cell rows, and the blocking member 140 can be tightly attached to the walls of the battery cell located in the gap to ensure the blocking effect of the blocking member 140.

Alternatively, in other embodiments, the blocking member 140 may not extend into the gap between two adjacent battery cell rows 113, but is only provided at the opening. At this point, the size of the blocking member 140 needs to be larger than the width of the gap to achieve a better blocking effect.

Figure 11:
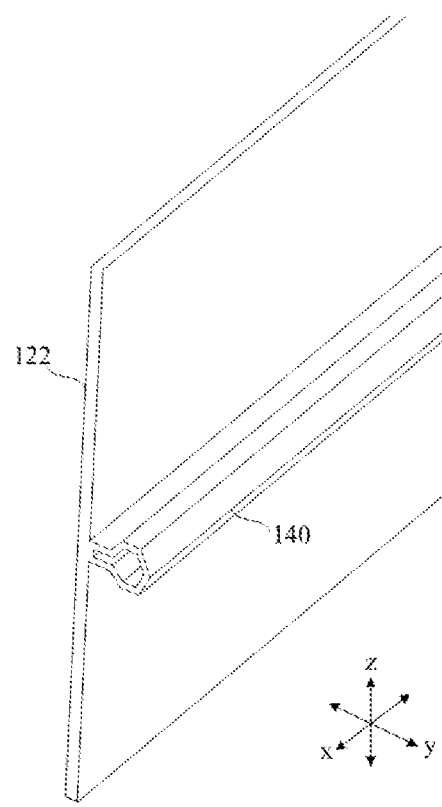
FIG. 11 is a schematic partial perspective diagram of the blocking member in the embodiment shown in FIG. 10.

FIG. 10 only schematically shows a cross-sectional diagram of the blocking member 140 in the yz-plane. In order to illustrate the three-dimensional shape of the blocking member 140 more clearly, FIG. 11 shows a schematic partial perspective diagram of the blocking member 140 in the embodiment shown in FIG. 10. As shown in FIG. 11, the wrinkles formed by the protruding insulation layer 122 in the signal transmission assembly 120 extend in the x-direction to form a strip-shaped blocking member 140. In other words, in the embodiment of the present application, in the x-direction, the blocking member 140 formed by the protruding insulation layer 122 extends in the x-direction to block the opening corresponding to the gap between the battery cell rows 113 extending in the x-direction.

An embodiment of the present application further provides a power consuming apparatus that may comprise the battery 10 according to the foregoing embodiments, the battery 10 being used for supplying electric energy to the power consuming apparatus. Optionally, the power consuming apparatus may be a vehicle 1, a ship or a spacecraft.

The battery 10 and the power consuming apparatus according to the embodiments of the present application are described above, and a method and apparatus for manufacturing a battery according to the embodiments of the present application will be described below. For the parts not described in detail, reference can be made to the foregoing embodiments.

Figure 12:
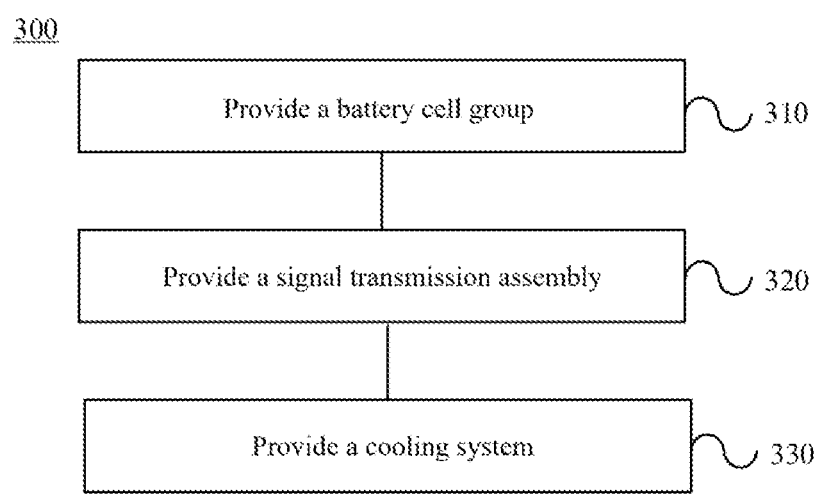
FIG. 12 is a schematic flow diagram of a method for manufacturing a battery according to an embodiment of the present application.

FIG. 12 shows a schematic flow diagram of a method 300 for manufacturing a battery according to an embodiment of the present application. As shown in FIG. 12, the method 300 may comprise the following steps.

In step 310, a battery cell group 110 is provided.

The battery cell group 110 comprises N battery cell rows 113 arranged in a first direction, battery cells 20 in each battery cell row 113 in the N battery cell rows 113 being arranged in a second direction, the first direction being perpendicular to the second direction, and N being an integer greater than 1.

In step 320, a signal transmission assembly 120 is provided.

The signal transmission assembly 120 is provided on a first face 101 of the battery cell group 110, the first face 101 being parallel to a plane determined by the first direction and the second direction. The signal transmission assembly 120 comprises a busbar component 121 and an insulation layer 122, the insulation layer 122 being used to enclose the busbar component 121, the insulation layer 122 having holes 123, and the busbar component 121 being configured to be electrically connected to the battery cells 20 in the battery cell group 110 at the holes 123.

In step 330, a cooling system 130 is provided.

The cooling system 130 is provided between two adjacent battery cell rows 110 in the N battery cell rows 110, a blocking member 140 is provided at an opening, in the first face 101, of a gap between two adjacent battery cell rows 110, and the blocking member 140 is used to block the opening to prevent the condensed liquid generated by the cooling system 130 from reaching the busbar component 121.

Figure 13:
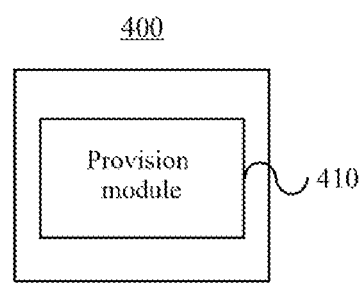
FIG. 13 is a schematic block diagram of an apparatus for manufacturing a battery according to an embodiment of the present application.

FIG. 13 shows a schematic block diagram of an apparatus 400 for manufacturing a battery according to an embodiment of the present application. As shown in FIG. 13, the apparatus 400 for manufacturing a battery may comprise: a provision module 410 and an installation module 420.

The provision module 410 is used to provide a battery cell group 110. The battery cell group 110 comprises N battery cell rows 113 arranged in a first direction, and the battery cells 20 in each battery cell row 113 in the N battery cell rows 113 are arranged in a second direction, the first direction being perpendicular to the second direction, and N being an integer greater than 1.

The provision module 410 is further used to provide a signal transmission assembly 120. The signal transmission assembly 120 is provided on a first face 101 of the battery cell group 110, the first face 101 being parallel to a plane determined by the first direction and the second direction. The signal transmission assembly 120 comprises a busbar component 121 and an insulation layer 122, the insulation layer 122 being used to enclose the busbar component 121, the insulation layer 122 having holes 123, and the busbar component 121 being configured to be electrically connected to the battery cells 20 in the battery cell group 110 at the holes 123.

The provision module 410 is further used to provide a cooling system 130. The cooling system 130 is provided between two adjacent battery cell rows 110 in the N battery cell rows 110, a blocking member 140 is provided at an opening, in the first face 101, of a gap between two adjacent battery cell rows 110, and the blocking member 140 is used to block the opening to prevent the condensed liquid generated by the cooling system 130 from reaching the busbar component 121.

While the present application has been described with reference to the preferred embodiments, various modifications can be made and equivalents can be provided to substitute for the components thereof without departing from the scope of the present application. In particular, the technical features mentioned in the embodiments can be combined in any manner, as long as there is no structural conflict. The present application is not limited to the specific embodiments disclosed herein, but includes all the technical solutions that fall within the scope of the claims.

The invention claimed is:

1. A battery, characterized by comprising: a battery cell group, the battery cell group comprising N battery cell rows, the N battery cell rows being arranged in a first direction, battery cells in each battery cell row in the N battery cell rows being arranged in a second direction, the first direction being perpendicular to the second direction, and N being an integer greater than 1;

a signal transmission assembly provided on a first face of the battery cell group, the first face being parallel to a plane determined by the first direction and the second direction, the signal transmission assembly comprising a busbar component and an insulation layer, the insulation layer being used to enclose the busbar component, the insulation layer having holes, and the busbar component being configured to be electrically connected to the battery cells in the battery cell group at the holes; and a cooling system provided between two adjacent battery cell rows in the N battery cell rows, wherein a blocking member is provided at an opening, facing the first face, of a gap between the two adjacent battery cell rows, and the blocking member is used to block the opening to prevent condensed liquid generated by the cooling system from reaching the busbar component.

2. The battery according to claim 1, characterized in that the blocking member extends into the gap.

3. The battery according to claim 2, characterized in that the blocking member is connected to the cooling system in the gap.

4. The battery according to claim 1, characterized in that the material of the blocking member is a liquid absorbing material.

5. The battery according to claim 1, characterized in that the blocking member has elasticity, and the blocking member is compressed between the insulation layer and the first face.

6. The battery according to claim 1, characterized in that the insulation layer protrudes toward the opening to form the blocking member.

7. The battery according to claim 1, characterized in that the cross section of the blocking member in a plane perpendicular to the second direction is convex-shaped or Ω-shaped.

8. The battery according to claim 1, characterized in that the blocking member is a strip-shaped blocking member that extends in the second direction.

9. A power consuming apparatus, characterized by comprising a battery according to claim 1 for supplying electric energy.

10. A method for manufacturing a battery, characterized by comprising:

providing a battery cell group, the battery cell group comprising N battery cell rows, the N battery cell rows being arranged in a first direction, battery cells in each battery cell row in the N battery cell rows being arranged in a second direction, the first direction being perpendicular to the second direction, and N being an integer greater than 1;

providing a signal transmission assembly, the signal transmission assembly being provided on a first face of the battery cell group, the first face being parallel to a plane determined by the first direction and the second direction, the signal transmission assembly comprising a busbar component and an insulation layer, the insulation layer being used to enclose the busbar component, the insulation layer having holes, and the busbar component being configured to be electrically connected to the battery cells in the battery cell group at the holes; and providing a cooling system, the cooling system being provided between two adjacent battery cell rows in the N battery cell rows, wherein a blocking member is provided at an opening, facing the first face, of a gap between the two adjacent battery cell rows, and the blocking member is to block the opening to prevent condensed liquid generated by the cooling system from reaching the busbar component.

11. An apparatus for manufacturing a battery, characterized by comprising a provision module used for:

providing a battery cell group, the battery cell group comprising N battery cell rows, the N battery cell rows being arranged in a first direction, battery cells in each battery cell row in the N battery cell rows being arranged in a second direction, the first direction being perpendicular to the second direction, and N being an integer greater than 1;

providing a signal transmission assembly, the signal transmission assembly being provided on a first face of the battery cell group, the first face being parallel to a plane determined by the first direction and the second direction, the signal transmission assembly comprising a busbar component and an insulation layer, the insulation layer being to enclose the busbar component, the insulation layer having holes, and the busbar component being configured to be electrically connected to the battery cells in the battery cell group at the holes; and providing a cooling system, the cooling system being provided between two adjacent battery cell rows in the N battery cell rows, wherein a blocking member is provided at an opening, facing the first face, of a gap between the two adjacent battery cell rows, and the blocking member is used to block the opening to prevent condensed liquid generated by the cooling system from reaching the busbar component.

\* \* \* \* \*